United States Patent
Kirshenbaum et al.

(10) Patent No.: US 10,565,045 B2
(45) Date of Patent: Feb. 18, 2020

(54) MODULARIZED COLLABORATIVE PERFORMANCE ISSUE DIAGNOSTIC SYSTEM

(71) Applicant: Microsoft Technology Licensing, LLC, Redmond, WA (US)

(72) Inventors: Alexander Kirshenbaum, Bellevue, WA (US); Aaron Edward Dietrich, Kirkland, WA (US); Jason L. Cohen, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/636,259

(22) Filed: Jun. 28, 2017

(65) Prior Publication Data

US 2019/0004884 A1 Jan. 3, 2019

(51) Int. Cl.
*G06F 11/07* (2006.01)
*G06F 11/30* (2006.01)

(52) U.S. Cl.
CPC ........ *G06F 11/079* (2013.01); *G06F 11/0706* (2013.01); *G06F 11/0751* (2013.01); *G06F 11/0778* (2013.01); *G06F 11/0793* (2013.01); *G06F 11/3003* (2013.01); *G06F 11/3006* (2013.01); *G06F 11/3055* (2013.01)

(58) Field of Classification Search
CPC ............... G06F 11/079; G06F 11/0706; G06F 11/0751; G06F 11/0778; G06F 11/3409; G06F 11/0793; G06F 11/3003; G06F 11/3006; G06F 11/3055
See application file for complete search history.

(56) References Cited

U.S. PATENT DOCUMENTS

| 7,191,364 | B2 | 3/2007 | Hudson et al. |
| 7,516,362 | B2 | 4/2009 | Connelly et al. |
| 7,689,872 | B2 * | 3/2010 | Doyle ................ G06F 11/079 714/26 |

(Continued)

OTHER PUBLICATIONS

"International Search Report and Written Opinion Issued in PCT Application No. PCT/US2018/033767", dated Dec. 10, 2018, 12 Pages.

(Continued)

*Primary Examiner* — Paul Contino
(74) *Attorney, Agent, or Firm* — Liang IP, PLLC

(57) ABSTRACT

A collaborative diagnostic system monitors events in a system and identifies a causality chain from a detected performance issue to the root cause of that performance issue. The collaborative diagnostic system includes multiple issue detectors, multiple analysis core modules, and multiple scenario modules that work together to identify the causality chain and root cause. Each issue detector is a module or component that includes logic to detect known behaviors in the system, such as performance issues in the system. Each analysis core module includes logic to analyze and correlate low level system behavior within a conceptual area. Within each analysis core module are one or more diagnostic modules that are specific to that analysis core module to help determine what is happening in the system. Each scenario module includes logic to take an appropriate responsive action in response to the root cause of a performance issue being determined.

20 Claims, 8 Drawing Sheets

(56) References Cited

U.S. PATENT DOCUMENTS

| | | |
|---|---|---|
| 7,818,418 B2 | 10/2010 | Bansal et al. |
| 7,840,501 B1 | 11/2010 | Sallam |
| 7,856,575 B2 | 12/2010 | Bock et al. |
| 8,386,848 B2 | 2/2013 | Grell et al. |
| 8,538,897 B2 | 9/2013 | Han et al. |
| 8,812,542 B1* | 8/2014 | Saring ................. G06F 16/1827 707/770 |
| 8,892,960 B2 | 11/2014 | Sambamurthy et al. |
| 9,213,590 B2 | 12/2015 | Lakshmanan et al. |
| 9,385,917 B1* | 7/2016 | Khanna ............... H04L 41/0645 |
| 9,712,413 B2* | 7/2017 | Windell .............. H04L 43/0817 |
| 2004/0225381 A1* | 11/2004 | Ritz .................... G06F 11/0709 700/26 |
| 2005/0049753 A1* | 3/2005 | Garcia-Ortiz ............ G05B 9/02 700/275 |
| 2007/0028220 A1 | 2/2007 | Miller et al. |
| 2011/0153540 A1* | 6/2011 | Beg .................... G06F 11/0748 706/52 |
| 2011/0154091 A1* | 6/2011 | Walton ................ G06F 11/0712 714/2 |
| 2011/0154097 A1* | 6/2011 | Barlow ............... G06F 11/0727 714/3 |
| 2012/0022707 A1* | 1/2012 | Budhraja ................ H02J 3/008 700/292 |
| 2013/0173332 A1 | 7/2013 | Ho et al. |
| 2013/0346786 A1* | 12/2013 | Thiel .................... G06F 11/0709 714/2 |
| 2014/0114613 A1* | 4/2014 | Wang ................ G05B 23/0205 702/185 |
| 2014/0280068 A1* | 9/2014 | Dhoopar ............... G06F 11/079 707/722 |
| 2015/0227446 A1 | 8/2015 | Horikawa |
| 2015/0288557 A1 | 10/2015 | Gates et al. |
| 2015/0304191 A1 | 10/2015 | Groenendijk et al. |
| 2016/0232085 A1 | 8/2016 | Vorganti |
| 2017/0031742 A1* | 2/2017 | Jilani .................... G06F 11/079 |
| 2017/0103128 A1* | 4/2017 | Li ....................... H04L 41/5074 |
| 2017/0242773 A1* | 8/2017 | Cirne .................. G06F 11/0706 |
| 2018/0089324 A1* | 3/2018 | Pal ........................ G06F 9/5011 |
| 2019/0073257 A1* | 3/2019 | Dasgupta ............ G06F 11/0754 |
| 2019/0182101 A1* | 6/2019 | Kulshreshtha ...... H04L 41/0631 |

OTHER PUBLICATIONS

Nudd, et al., "Pace—A Toolset for the Performance Prediction of Parallel and Distributed Systems", In International Journal of High Performance Computing Applications, vol. 14, Issue 3, Aug. 1, 2000, pp. 228-251.

Zhou, et al., "Distance Based Root Cause Analysis and Change Impact Analysis of Performance Regressions", In Journal of Mathematical Problems in Engineering, Jun. 21, 2015, 10 pages.

* cited by examiner

Analysis Cores 124

MODULARIZED COLLABORATIVE PERFORMANCE ISSUE DIAGNOSTIC SYSTEM

BACKGROUND

As computing technology has advanced, computing devices have become increasingly complex. Over any given time frame, multiple different processes and threads can be running in these computing devices, and may number on the order of hundreds, thousands, or more. Many of these different processes and threads are performing similar operations, such as storage device input/output (I/O), network data transfers, system resource accesses, and so forth. Given the large number of processes and threads that are performing similar operations, it can be difficult to detect the cause of performance issues or other problems in the computing devices. This can lead to poor computing device operation, which can lead to user dissatisfaction with their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a system comprising includes multiple issue detectors, multiple analysis core modules, and multiple scenario modules. The multiple issue detectors are each configured to detect one or more performance issues in the system. The multiple analysis core modules are each configured to analyze and correlate system behavior to determine root causes for the one or more performance issues, each of the multiple issue detectors being further configured to communicate, in response to a detected performance issue in the system, a query regarding the detected performance issue to one or more of the multiple analysis core modules. The multiple scenario modules are each configured to take one or more responsive actions. A first scenario module of the multiple scenario modules, which is associated with a root cause for the detected performance issue, takes a responsive action in response to the root cause for the detected performance issue being determined by the multiple analysis modules.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A modularized collaborative performance issue diagnostic system is discussed herein. A collaborative diagnostic system monitors events in a system and identifies a causality chain from a detected performance issue to the root cause of that performance issue. The collaborative diagnostic system includes multiple issue detectors, multiple analysis core modules, and multiple scenario modules.

Each issue detector is a module or component that includes logic to detect known behaviors in the system, such as performance issues in the system, bad behaviors that can lead to performance issues in the system, and so forth. Each analysis core module includes logic to analyze and correlate low level system behavior within a conceptual area. Each conceptual area refers to a class or type of behavior, such as I/O behavior or operations, CPU behavior or operations, power management behavior or operations, and so forth. Within each analysis core module are one or more diagnostic modules (also referred to as helper modules) that are specific to that analysis core module to help determine what is happening in the system. Each scenario module includes logic to take an appropriate responsive action in response to the root cause of a performance issue being determined.

The various diagnostic modules and analysis core modules work together to identify the causality chain and root cause of a performance issue. The diagnostic modules and analysis core modules include query interfaces allowing them to collaborate with one another to track down the root cause of a performance issue and generate a causality chain.

The techniques discussed herein provide a scalable, expandable collaborative diagnostic system allowing root causes of various different performance issues to be determined. Additional issue detectors, analysis core modules, diagnostic modules, and/or scenario modules can be added into the collaborative diagnostic system as desired for newly discovered information regarding the system, such as newly discovered or potential problems in a system, newly implemented system behaviors, newly created scenarios and so forth. Furthermore, the techniques discussed herein avoid the need for the developer to know ahead of time what the causality chain is for a particular performance issue. Rather, the individual analysis core modules and diagnostic modules can operate to identify the causality chain in response to detection of the performance issue.

Figure 1:
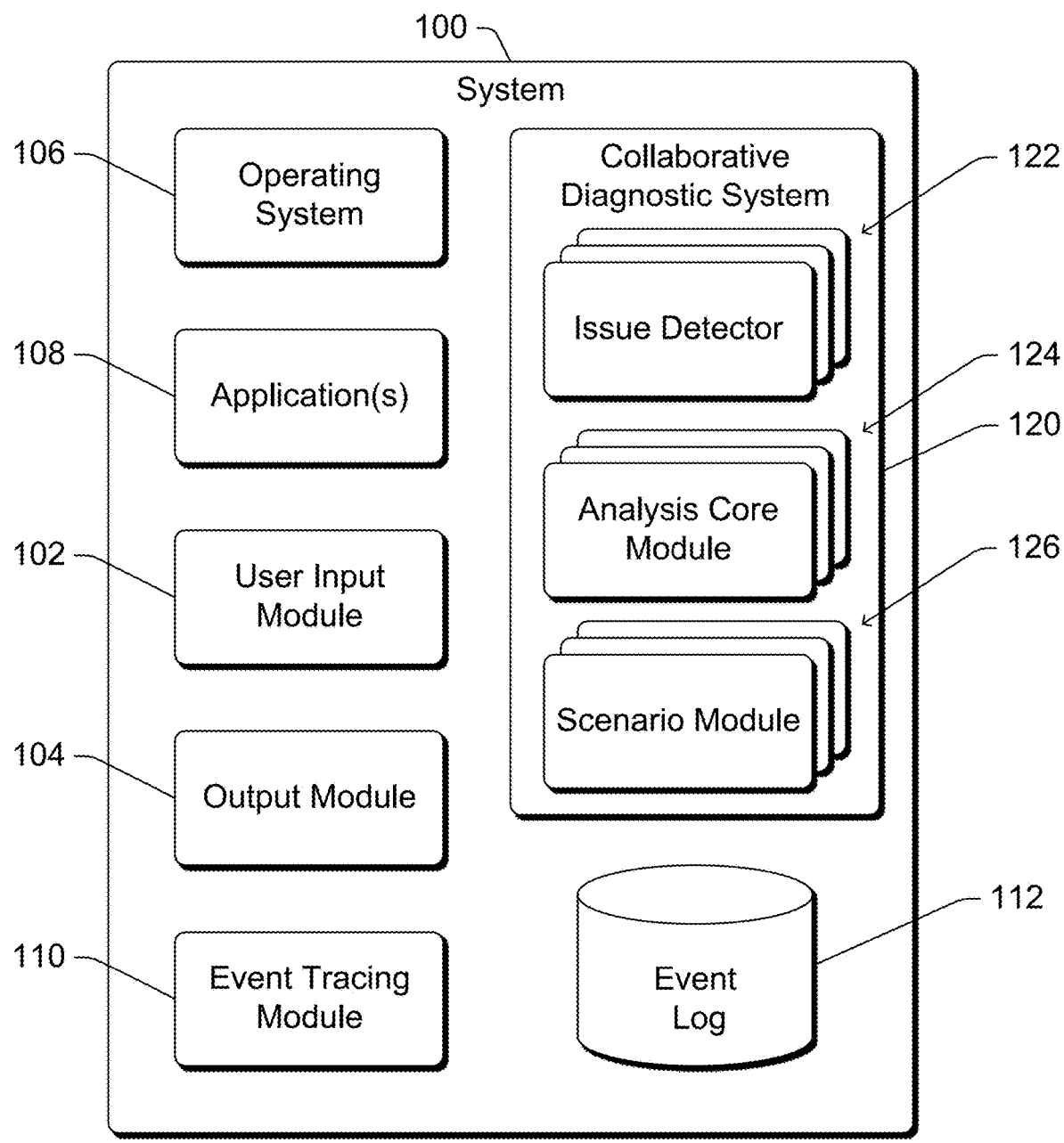
FIG. 1 illustrates an example system implementing the modularized collaborative performance issue diagnostic system in accordance with one or more embodiments.

FIG. 1 illustrates an example system 100 implementing the modularized collaborative performance issue diagnostic system in accordance with one or more embodiments. The system 100 can be implemented by one or more computing devices. A computing device implementing the system 100 can be a variety of different types of devices, such as a physical device or a virtual device. For example, a computing device implementing the system 100 can be a physical device such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. A computing device implementing the system 100 can also be a virtual device, such as a virtual machine running on a physical device. A virtual machine can be run on any of a variety of different types of physical devices (e.g., any of the various types listed above). Thus, computing devices implementing the system 100 may range from full resource devices with substantial memory and processor resources (e.g., personal computers, game consoles) to low-resource devices with limited memory and/or processing resources (e.g., traditional set-top boxes, handheld game consoles).

In one or more embodiments, the system 100 is implemented as a service that is run on one or more computing devices. Such a service can be, for example, a service hosted in the cloud. In such embodiments, the techniques discussed herein are used to perform diagnostics for the service rather than for a specific computing device.

The system 100 includes a user input module 102 and an output module 104. The user input module 102 receives user inputs from a user of the system 100. User inputs can be provided in a variety of different manners, such as by pressing one or more keys of a keypad or keyboard of the system 100, pressing one or more keys of a controller (e.g., remote control device, mouse, track pad, etc.) of the system 100, pressing a particular portion of a touchpad or touchscreen of the system 100, making a particular gesture on a touchpad or touchscreen of the system 100, and/or making a particular gesture on a controller (e.g., remote control device, mouse, track pad, etc.) of the system 100. User inputs can also be provided via other physical feedback input to the system 100, such as tapping any portion of a computing device implementing the system 100, an action that can be recognized by a motion detection or other component of the system 100 (such as shaking a computing device implementing the system 100, rotating a computing device implementing the system 100, bending or flexing a computing device implementing the system 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the system 100. This content can be, for example, a display or playback portion of a user interface (UI). The content can be displayed or otherwise played back by components of a computing device implementing the system 100 (e.g., speakers, interactive display devices, etc.). Alternatively, the output module 104 can generate one or more signals that are output to other devices or components (e.g., speakers, display devices, etc.) that are separate from a computing device implementing the system 100.

The system 100 also includes an operating system 106 and one or more applications 108. The operating system 106 includes one or more programs or modules that manage various aspects of the system 100, allow applications 108 to run, and so forth. Although the user input module 102 and the output module 104 are illustrated separately from the operating system 106, it should be noted that the operating system 106 can optionally include the user input module 102 and the output module 104.

The applications 108 are various different programs that can be run by the operating system 106. The applications can be any of a variety of different application programs, such as utility programs, educational programs, entertainment programs, productivity programs, and so forth.

The system 100 also includes an event tracing module 110. The applications 108 as well as the programs of the operating system 106 are run as one or more processes on the system 100. These processes perform various tasks, which are logged by the event tracing module 110 in an event log 112. The event log 112 can be any of a variety of different storage devices, such as a magnetic disk, optical disc, Flash memory, random access memory (RAM), and so forth.

The event tracing module 110 logs various different data (also referred to as metadata) regarding events that occur in the system 100. These events refer to various calls made by a process in the system 100 or other events in the system 100 (e.g., changes in whether a desktop is displayed, changes in which window is displayed, changes in power state (e.g., whether the system 100 is operating in a battery save mode), and so forth). For example, the event tracing module 110 can log data regarding inter-process calls in the system 100, file I/O access by a process in the system 100, calls by a process to the operating system 106, network access by a process in the system 100, and so forth. Various data regarding the calls or events can be logged, such as a timestamp (e.g., date and time) of when the call was made or the event occurred, an identifier of the process that made the call, what the response was (if any) that the process received to the call, what the target of the call was (e.g., an identifier of another process, an identifier of a file, an identifier of a network address (e.g., an Internet protocol (IP) address), and so forth). Although illustrated as separate from the operating system 106, the event tracing module 110 can optionally be part of the operating system 106.

The event tracing module 110 can be implemented in a variety of different manners. For example, the event tracing module 110 can be the Event Tracing for Windows (ETW) service or an analogous service. By way of another example, the event tracing module 110 can be a module or system that provides performance counters' values, telemetry data, and so forth.

The system 100 also includes a collaborative diagnostic system 120. The collaborative diagnostic system 120 identifies, based at least in part on the information stored in the event log 112, performance issues within the system and a causality chain from an identified performance issue to the root cause of that performance issue. The collaborative diagnostic system 120 includes multiple issue detectors 122, multiple analysis core modules 124, and multiple scenario modules 126.

Each issue detector 122 is a module or component that includes logic to detect known behaviors in the system 100, such as performance issues in the system 100, bad behaviors that can lead to performance issues in the system 100, and so forth. Various different behaviors or performance issues can be detected, such as video glitches, audio glitches, high energy consumption, a long duration in performing some operation, and so forth. As used herein, a performance issue refers to a behavior in the system 100 that leads to, or may lead to, an undesirable result. An undesirable result is a result that a creator of an issue detector 122 (e.g., a user or developer of the system 100) deems undesirable. Each issue detector 122 can be implemented in a variety of different manners, but generally analyzes the information in the event log 112 and determines whether one or more of various rules, criteria, parameters, etc. are satisfied. If the appropriate rules, criteria, parameters, etc. are satisfied, then the issue detector determines that the a particular behavior or performance issue has been detected. For example, an issue detector 122 may detect video glitches and determine that a video glitch has occurred if a video data buffer has not been refreshed within a threshold amount of time (e.g., 16 milliseconds). A behavior that is considered undesirable by a user or a designer of the system 100 (e.g., video glitches, high energy consumption) is also referred to as a bad behavior. Bad behaviors can be specified by a user or designer of the system 100 by specifying an issue detector 122 that detects those bad behaviors.

In one or more embodiments, the issue detector 122 is hard-coded logic. Alternatively, the issue detector 122 can be implemented as a scalable behavior detection system that includes one or more behavior definitions that each identify one or more basic operations the system 100 (such as data storage device I/O, network I/O, memory accesses, and so forth). If the basic operations specified by a behavior definition are performed in the system 100 as specified in the behavior definition, then the issue detector determines that the particular behavior has been detected. Such a behavior definition is optionally scalable, allowing the behavior definition to be modified over time and during operation of the system 100.

At least one issue detector 122 is provided by a vendor of designer of the operating system 106 and/or system 100. Additionally or alternatively, at least one issue detector 122 can be provided by another entity or vendor. For example, a developer of an application 108 can provide an issue detector 122 to allow performance issues in that application 108 (e.g., the application 108 takes too long to launch) to be detected.

Each analysis core module 124 includes logic to analyze and correlate low level system behavior within a conceptual area. Each conceptual area refers to a class or type of behavior, such as I/O behavior or operations, CPU behavior or operations, power management behavior or operations, and so forth. Different analysis core modules 124 are included for different conceptual areas. For example, one analysis core module 124 can be a central processing unit (CPU) analysis module that analyzes CPU starvation, CPU contention, as well as deferred procedure call (DPC) and interrupt related activity. By way of another example, another analysis core module 124 can be an I/O analysis module that analyzes and correlates I/O delays, I/O contention, I/O starvation, and so forth.

Within each analysis core module 124 are one or more diagnostic modules (also referred to as helper modules) that are specific to that analysis core module 124 to help determine what is happening in the system 100. Each analysis core module 124 is responsible for managing the diagnostic modules included in that analysis core module 124. These diagnostic modules perform behavior-specific analysis ranging from low level behaviors (e.g., resource starvation or contention) to higher level behaviors (e.g., fragmented access patterns and special activities such as prefetching I/O and page faults). One or more analysis core modules 124, employing the various diagnostic modules, determine the root cause of the performance issue detected by the issue detector 122.

Each scenario module 126 includes logic to take an appropriate responsive action in response to the root cause of a performance issue being determined. Different scenario modules 126 are associated with different performance issues and root causes. For example, a scenario module 126 can be associated with a scenario where process foo.exe is executing having a specific function in the executing call stack. Another scenario module 126 can be associated with a scenario where process bar.exe accesses files f1 and f2.

Various different responsive actions can be taken by a scenario module 126. Examples of such responsive actions include displaying a notification on a display device of the system 100 for viewing by a user of the system 100, recording the occurrence of the detected performance issue and root cause (and optionally causality chain) in a file or other record, notifying an administrator or designer of the service 100 that the performance issue occurred (and optionally the root cause and causality chain), and so forth.

In one or more embodiments, the scenario modules 126 can also aggregate information, providing a summary or aggregated view of the causality chain and/or root cause. For example, rather than displaying or otherwise presenting the entire causality chain to the user, a single element of the causality chain or the root cause can be displayed (e.g., an indication that there was a delay because the operating system was installing or downloading an update). This provides a more user-friendly indication of the root cause and/or causality chain to a user of the system 100.

Generally, during operation of the system 100, each issue detector 122 analyzes the information in the event log 112 and determines based on this analysis whether a performance issue has occurred. In response to an issue detector 122 determining that a performance issue has occurred, the issue detector 122 sends a communication to one or more of the analysis core modules 124 querying what operations were being performed by a thread being executed at the time the performance issue was detected. An analysis core module 124 (e.g., a CPU scheduling module) that is associated with (also referred to herein as owns) a CPU scheduler receives the query (including an indication of the time at which the performance issue was detected) from the issue detector 122 and proceed to determine what operations performed by a thread being executed at the time the performance issue was detected. The CPU scheduler manages execution of different processes and process threads on the CPU, and thus is aware of which threads were scheduled to execute at which times on the CPU.

Different analysis core modules 124 are associated with different conceptual areas, and the analysis core modules 124 communicate with one another to track down (e.g., identify) the root cause of the performance issue. This tracking down of the root cause of the performance issue results in a causality chain from an identified performance issue to the root cause of that performance issue. The causality chain is a path from the performance issue to the root cause, with each node or element in the path indicating an issue and what caused the issue (e.g., the performance issue was due to a slow I/O operation, the slow I/O operation was due to a memory page needing to be paged into memory, the memory page needed to be paged in because there was memory pressure in the system, and so forth). It should be noted that the causality chain can have multiple branches at each node (e.g., the slow I/O operation was due to both a memory page needing to be paged into memory and I/O contention from multiple processes). Thus, the causality chain may take the form of a tree or other graph.

Each of the analysis core modules 124 has a query interface that allows an issue detector 122 to inquire into the various analysis core modules 124 for the cause of an observed behavior or presence of a certain activity. An issue detector 122 communicates or sends a query as to why the observed behavior or certain activity occurred detected by the issue detector 122 occurred. Examples of such queries include why was a synchronization deadline missed, why did a particular operation take too long to complete, why is more than a threshold amount (e.g., 80% of capacity) of energy being consumed in the system 100, and so forth. In one or more embodiments, the issue detectors 122 communicate the query to a particular analysis core module directly (e.g., the CPU scheduling module), which operates as a central orchestrator for identifying the root cause and invokes the appropriate analysis core modules 124 when needed. In such embodiments, this central orchestrator includes logic to identify which of the analysis core modules 124 is the appropriate analysis core module 124 to respond to the query. Various different rules, criteria, parameters, and so forth can be used by such a central orchestrator to determine which of the analysis core modules 124 is the appropriate analysis core module 124 to respond to the query. For example, such a central orchestrator can determine that an I/O core module is the appropriate analysis core module 124 to respond to a query regarding why a long I/O occurred.

Additionally or alternatively, an issue detector 122 can include logic that allows the issue detector 122 to know which analysis core module 124 to send the query to. For example, the issue detector 122 may be a video glitch detector that includes logic to determine that the video glitch was caused by a desktop window manager (dwm.exe) process not being able to provide an image bitmap in time, and that this happened because the dwm.exe process was waiting on storage I/O. Having that knowledge, the video glitch detector interacts with one of the analysis core modules 124 that is responsible for diagnosing storage I/O related issues.

Additionally or alternatively, the issue detectors 122 can broadcast the query to all analysis core modules 124, and the appropriate analysis core module 124 responds. In such embodiments, each analysis core module 124 includes logic to determine whether it is the appropriate analysis core module 124 to respond to the query. Various different rules, criteria, parameters, and so forth can be used by each analysis core module 124 to determine whether it is the appropriate analysis core module 124 to respond to the query. For example, an I/O core module can determine that it is the appropriate analysis core module 124 to respond to a query regarding why a long I/O occurred.

Similarly, the query interfaces of the analysis core modules 124 allow one or more other analysis core modules 124 to inquire into the various analysis core modules 124 for the cause of an observed behavior or presence of a certain activity. An analysis core module 124 communicates or sends a query as to why the observed behavior or certain activity occurred being analyzed by or identified by the analysis core module 124 occurred. Examples of such queries include what was the reason behind a paging I/O, why was a prefetch I/O being performed, and so forth. In one or more embodiments, the analysis core modules 124 communicate the query to a particular analysis core module directly (e.g., the CPU scheduling module), which operates as a central orchestrator for identifying the root cause and invokes the appropriate analysis core modules 124 when needed. In such embodiments, this central orchestrator includes logic to identify which of the analysis core modules 124 is the appropriate analysis core module 124 to respond to the query, analogous to determining which of the analysis core modules 124 is the appropriate analysis core module to respond to a query from an issue detector 122. Additionally or alternatively, the issue detectors 122 can broadcast the query to all analysis core modules 124, and the appropriate analysis core module 124 responds. In such embodiments, each analysis core module 124 includes logic to determine whether it is the appropriate analysis core module 124 to respond to the query, analogous to determining which of the analysis core modules 124 is the appropriate analysis core module to respond to a query from an issue detector 122.

It should be noted that a single query interface can be implemented for (included in) an analysis core module 124, in which case the single query interface includes logic to route the query to an appropriate diagnostic module within the analysis core module 124. Additionally or alternatively each individual diagnostic module within an analysis core module can include a query interface, and each such query interface operates as a query interface for the analysis core module 124.

The issue detectors 122, analysis core modules 124, diagnostic modules, and scenario modules 126 communicate via these query interfaces. These query interfaces support queries in the general format of what caused or is responsible for something happening, such as "what caused operation P or behavior B?", "what scenario module is responsible for process P executing code C?", "who is contending with operations O1 and O2?", and so forth. Note that such a query interface framework is easily extensible to newly discovered problems, newly implemented system behaviors, newly created scenarios, and so forth.

The communications between the issue detectors 122 and the analysis core modules 124, as well as among the analysis core modules 124, can be implemented using any of a variety of different public and/or proprietary techniques. For example, a particular analysis core module (e.g., the CPU scheduling module) can be communicated with directly using any of a variety of inter-process communication protocols. By way of another example, each analysis core module 124 can subscribe to events or messages on a particular communication channel, and any query can be submitted as an event or message on that particular communication channel.

Figure 2:
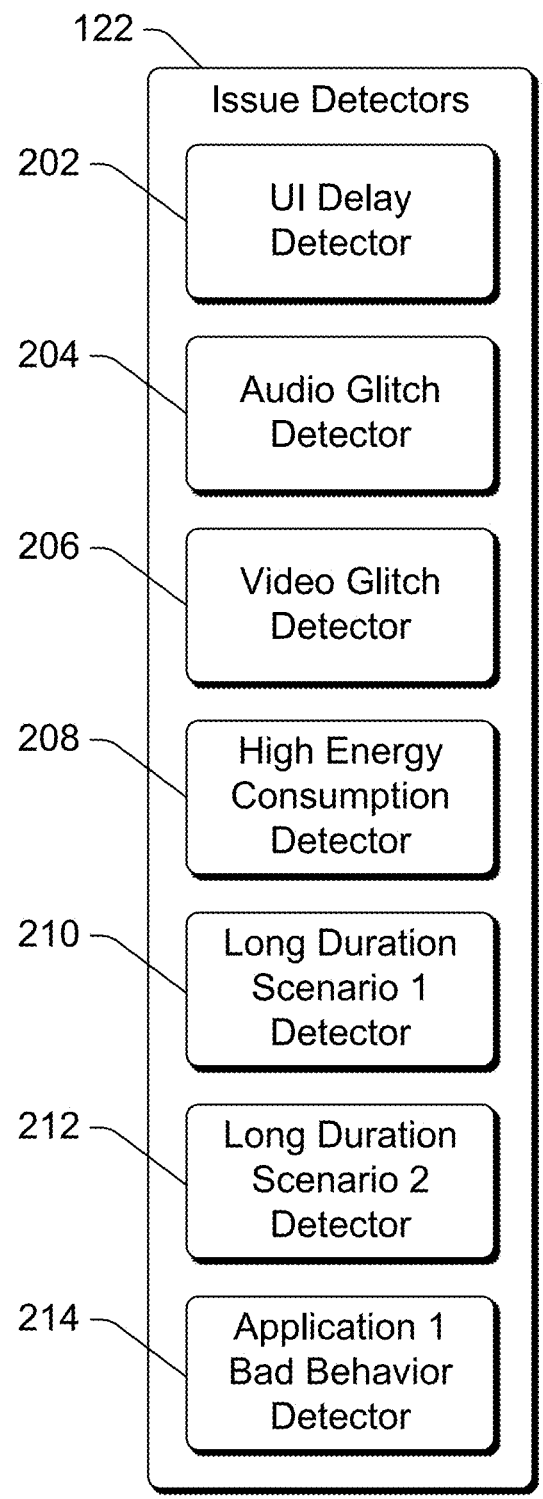
FIG. 2 illustrates an example set of issue detectors in accordance with one or more embodiments.

FIG. 2 illustrates an example set of issue detectors 122 in accordance with one or more embodiments. The issue detectors 122 illustrated in FIG. 2 include a UI delay detector 202, an audio glitch detector 204, a video glitch detector 206, a high energy consumption detector 208, a long duration scenario 1 detector 210, a long duration scenario 2 detector 212, and an application A bad behavior detector 214. It is to be appreciated that the example issue detectors 122 shown in FIG. 2 are only examples. Not all of the issue detectors 122 shown in FIG. 2 need be included in a system 100 of FIG. 1 and/or additional issue detectors 122 can be included in a system 100.

The UI delay detector 202 includes logic to detect known behaviors (e.g., performance issues or bad behaviors) related to the UI displayed by the system 100. The UI delay detector 202 analyzes various information in the event log 112 to identify situations in which the UI displayed by the system 100 (e.g., by the output module 104) is delayed (e.g., an initial UI display when starting or rebooting the system 100 takes longer than a threshold amount of time (e.g., 10 seconds), changes to a UI display take longer than a threshold amount of time (e.g., 300 milliseconds), and so forth).

The audio glitch detector 204 includes logic to detect known behaviors (e.g., performance issues or bad behaviors) related to audio playback in the system 100. The audio glitch detector 204 analyzes various information in the event log 112 to identify situations in which there is a glitch in audio playback in the system 100 (e.g., an audio data buffer has not been refreshed within a threshold amount of time (e.g., 20 milliseconds)).

The video glitch detector 206 includes logic to detect known behaviors (e.g., performance issues or bad behaviors) related to video playback in the system 100. The video glitch detector 206 analyzes various information in the event log 112 to identify situations in which there is a glitch in video playback in the system 100 (e.g., a video data buffer has not been refreshed within a threshold amount of time (e.g., 16 milliseconds)).

The high energy consumption detector 208 includes logic to detect known behaviors (e.g., performance issues or bad behaviors) related to energy consumption in the system 100. The high energy consumption detector 208 analyzes various information in the event log 112 to identify situations in which energy consumption in the system 100 is deemed to be too high (e.g., the energy consumption has exceeded a threshold amount (e.g., 80% of a maximum amount of energy available from a battery of the system 100), energy is being consumed at greater than a threshold rate (e.g., at a rate of 25 watts per hour), and so forth).

The long duration scenario 1 detector 210 includes logic to detect known behaviors (e.g., performance issues or bad behaviors) related to delays in the system 100 of FIG. 1. The long duration scenario 1 detector 210 analyzes various information in the event log 112 to identify situations in which a particular operation or action is taking too long (e.g., greater than a threshold amount of time, such as 5 seconds).

The long duration scenario 2 detector 212 includes logic to detect known behaviors (e.g., performance issues or bad behaviors) related to delays in the system 100 of FIG. 1. The long duration scenario 2 detector 212 analyzes various information in the event log 112 to identify situations in which a particular operation or action is taking too long (e.g., greater than a threshold amount of time, such as 600 milliseconds). The long duration scenario 2 detector 212 is similar to the long duration scenario 1 detector 210, but identifies different delay situations (e.g., delays for different operations or actions, delays for different threshold amounts of time, combinations thereof, and so forth).

The application A bad behavior detector 214 includes logic to detect known behaviors (e.g., performance issues or bad behaviors) related to a particular application 108 (referred to as application A) in the system 100 of FIG. 1. The application A bad behavior detector 214 analyzes various information in the event log 112 to identify situations in which the known behavior occurs in the application. The application A bad behavior detector 214 can be provided or specified by, for example, a developer of application A to allow the collaborative diagnostic system 120 of FIG. 1 to identify the occurrence of particular behaviors in the application A. Any of various different behaviors can be detected, such as delays in particular operations occurring, accesses to particular resources (e.g., networks, storage devices) exceeding a threshold rate (e.g., more than 3 accesses per minute) or duration (e.g., more than 10 seconds), and so forth.

Figure 3A:
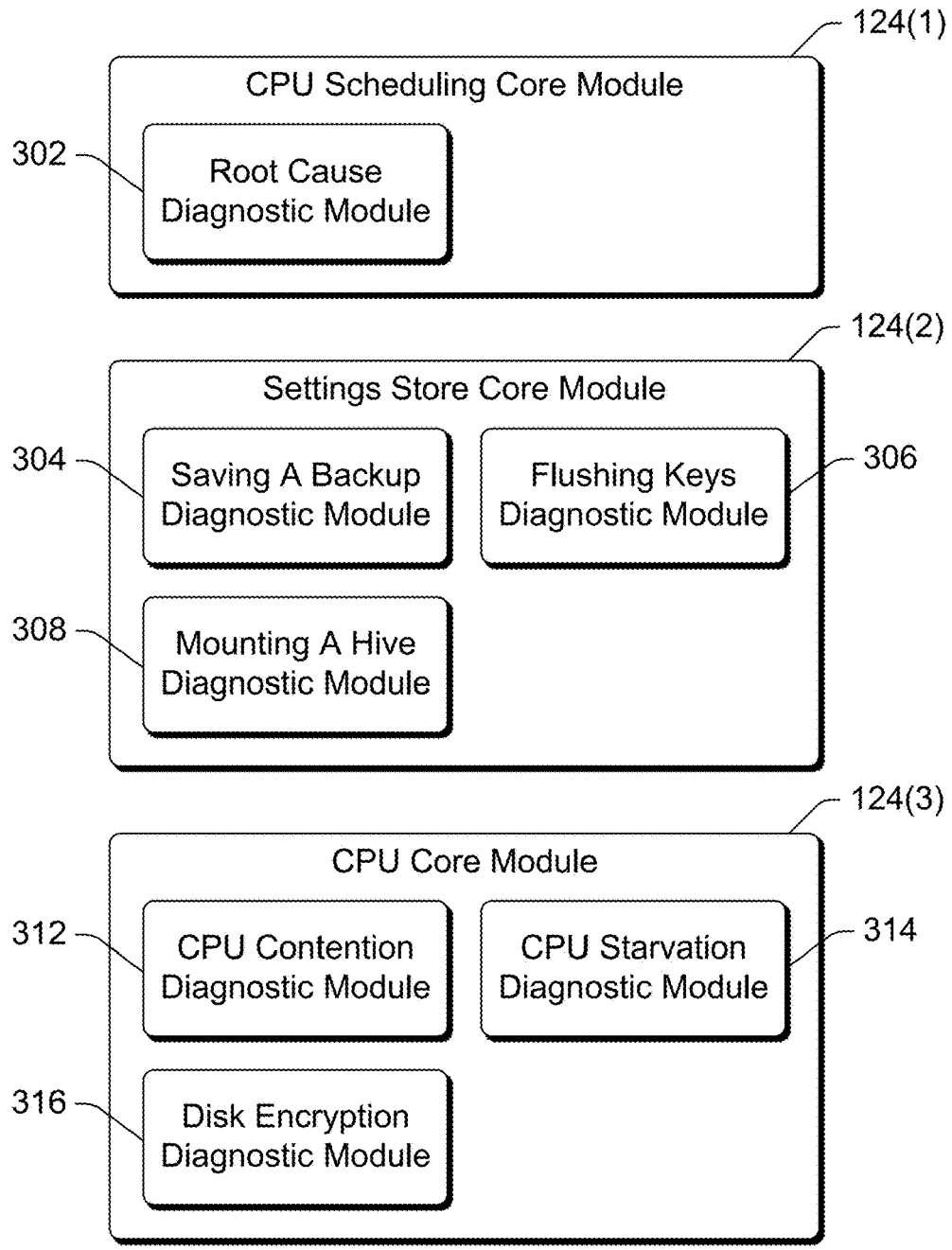
FIGS. 3A and 3B illustrate an example set of core modules in accordance with one or more embodiments.
Figure 3B:
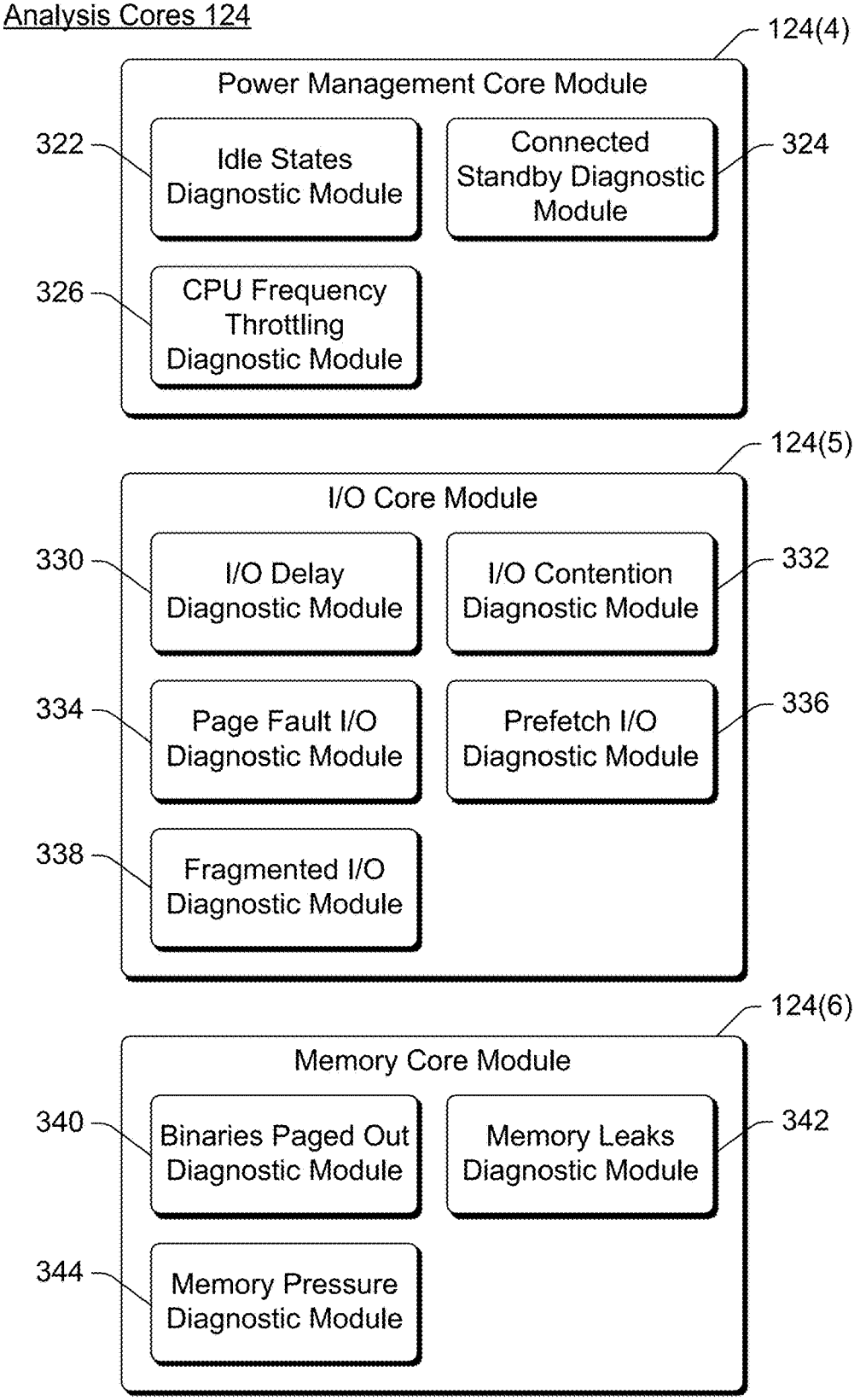

FIGS. 3A and 3B illustrate an example set of core modules 124 in accordance with one or more embodiments. The core modules 124 illustrated in FIGS. 3A and 3B include a CPU scheduling core module 124(1), a settings store core module 124(2), a CPU core module 124(3), a power management core module 124(4), an I/O core module 124(5), and a memory core module 124(6). It is to be appreciated that the example core modules 124 shown in FIGS. 3A and 3B are only examples. Not all of the core modules 124 shown in FIGS. 3A and 3B need be included in a system 100 of FIG. 1 and/or additional core modules 124 can be included in a system 100.

The CPU scheduling core module 124(1) includes logic to analyze and correlate low level system behavior within the conceptual area of CPU scheduling. The CPU scheduling core module 124(1) includes a root cause diagnostic module 302 that maintains a timeline of the activities of threads of processes in the system 100. The root cause diagnostic module 302 knows, based on information in the event log 112, what class or type of behavior (e.g., network I/O, storage device I/O, CPU execution, etc.) at any given time. The root cause diagnostic module 302 can then communicate the query to the appropriate one of the other analysis core modules 124 based on the query received from the issue detector 122.

The settings store core module 124(2) includes logic to analyze and correlate low level system behavior within the conceptual area of operating system settings (e.g., an operating system registry). The settings store core module 124(2) includes a saving a backup diagnostic module 304, a flushing keys diagnostic module 306, and a mounting a hive diagnostic module 308. The saving a backup diagnostic module includes logic to determine when a backup of the operating system settings is being saved. The flushing keys diagnostic module 306 includes logic to determine when keys or other operating system settings are being written to (flushed to) to disk or another storage device. The mounting a hive diagnostic module 308 includes logic to determine when keys or other operating system settings are being read from (mounted) disk or another storage device.

The CPU core module 124(3) includes logic to analyze and correlate low level system behavior within the conceptual area of CPU operation. The CPU core module 124(3) includes a CPU contention diagnostic module 312, a CPU starvation diagnostic module 314, and a disk encryption diagnostic module 316. The CPU contention diagnostic module 312 includes logic to determine when there is high contention for the CPU (e.g., situations where a virtual machine wait too long (e.g., greater than a threshold amount of time, such as 1 second) to be executed on the CPU). The CPU starvation diagnostic module 314 includes logic to determine when one or more threads are being starved (e.g., situations where threads wait too long (e.g., greater than a threshold amount of time, such as 200 milliseconds) to be scheduled for execution on the CPU). The disk encryption diagnostic module 316 includes logic to determine when the CPU is encrypting a portion of the disk or other storage device.

The power management core module 124(4) includes logic to analyze and correlate low level system behavior within the conceptual area of power management. The power management core module 124(4) includes an idle states diagnostic module 322, a connected standby diagnostic module 324, and a CPU frequency throttling diagnostic module 326. The idle states diagnostic module 322 includes logic to determine when the CPU is in an idle state (e.g., not running any applications 108 or operating system 106 programs). The connected standby diagnostic module 324 includes logic to determine when the system is in a connected standby state (e.g., the system is running in a low power mode but is still able to receive communications from other devices or systems). The CPU frequency throttling diagnostic module 326 includes logic to determine when the CPU frequency has been reduced (e.g., in order to conserve power).

The I/O core module 124(5) includes logic to analyze and correlate low level system behavior within the conceptual area of I/O. The I/O core module 124(5) includes an I/O delay diagnostic module 330, an I/O contention diagnostic module 332, a page fault I/O diagnostic module 334, a prefetch I/O diagnostic module 336, and a fragmented I/O diagnostic module 338. The I/O delay diagnostic module 330 includes logic to determine when an I/O delay occurred (e.g., an I/O took longer than a threshold amount of time, such as 1 second). The I/O contention diagnostic module 332 includes logic to determine when there are two sources of contending I/O activity (e.g., two streams of write requests each from a different process). The page fault I/O diagnostic module includes logic to determine when I/O data was read from disk or other storage device not long ago (e.g., less that a threshold amount of time, such as 10 seconds) and should be cached in memory unless it was evicted due to memory pressure. The prefetch I/O diagnostic module 336 includes logic to determine when I/O data was read from disk or other storage device as part of a prefetch operation not long ago (e.g., less that a threshold amount of time, such as 15 seconds) and should be cached in memory. The fragmented I/O diagnostic module 338 includes logic to determine when I/O data is fragmented or otherwise scattered across the disk or other storage device.

The memory core module 124(6) includes logic to analyze and correlate low level system behavior within the conceptual area of memory (e.g., random access memory (RAM)). The memory core module 124(6) includes a binaries paged out diagnostic module 340, a memory leaks diagnostic module 342, and a memory pressure diagnostic module 344. The binaries paged out diagnostic module 340 includes logic to determine when a memory page including a binary to be executed had been paged out and needed to be paged back in in order to be executed. The memory leaks diagnostic module 342 includes logic to determine when allocated memory is old (e.g., the memory was allocated more than a threshold amount of time ago, such as 5 hours). The memory pressure diagnostic module 344 includes logic to determine why memory pressure existed in the system.

Figure 4:
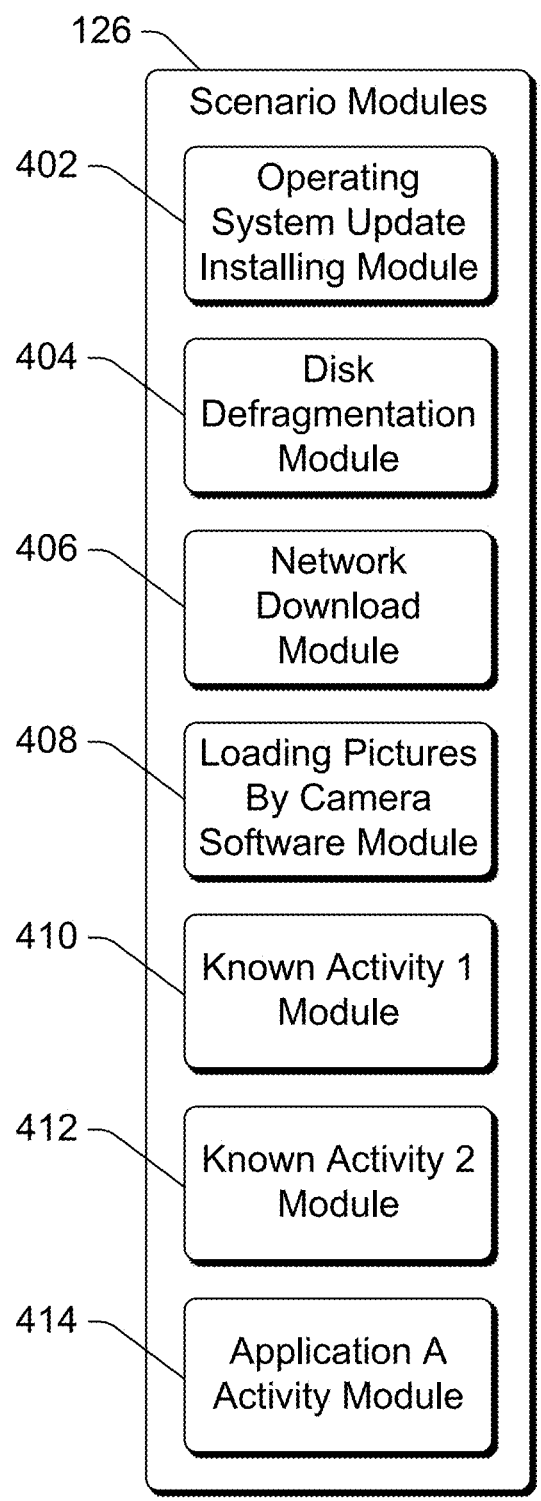
FIG. 4 illustrates an example set of scenario modules in accordance with one or more embodiments.

FIG. 4 illustrates an example set of scenario modules 126 in accordance with one or more embodiments. The scenario modules 126 illustrated in FIG. 4 include an operating system update installing module 402, a disk defragmentation module 404, a network download module 406, a loading pictures by camera software module 408, a known activity 1 module 410, a known activity 2 module 412, and an application A activity module 414. It is to be appreciated that the example scenario modules 126 shown in FIG. 4 are only examples. Not all of the scenario modules 126 shown in FIG. 4 need be included in a system 100 of FIG. 1 and/or additional scenario modules 126 can be included in a system 100.

The operating system update installing module 402 includes logic to take an appropriate responsive action in response to a performance issue having a root cause that was an operating system update being installed in the system 100. The disk defragmentation module 404 includes logic to take an appropriate responsive action in response to a performance issue having a root cause that was a disk (or other storage device) defragmentation occurring in the system 100.

The network download module 406 includes logic to take an appropriate responsive action in response to a performance issue having a root cause that was a download over a network occurring. The loading pictures by camera software module 408 includes logic to take an appropriate responsive action in response to a performance issue having a root cause that was data (e.g., pictures, video, or other recordings) being downloaded by a program from a camera or other image capture device.

The known activity 1 module 410 includes logic to take an appropriate responsive action in response to a performance issue having a root cause that was some other known activity, referred to as activity 1. This known activity can be any of a variety of different activities, such as data I/O or network accesses, power modes or settings, CPU state or workload, and so forth.

The known activity 2 module 412 includes logic to take an appropriate responsive action in response to a performance issue having a root cause that was some other known activity, referred to as activity 2. This known activity can be any of a variety of different activities, analogous to the activity associated with known activity 1 module 410, although the modules 410 and 412 are associated with different known activities.

The application A activity module 414 includes logic to take an appropriate responsive action in response to a performance issue having a root cause that was due to some activity in a particular application 108 (referred to as application A). This activity can be any of a variety of different activities, including activities specific to the operation of application A. The application A activity module 414 can be provided or specified by, for example, a developer of application A.

Returning to FIG. 1, the collaborative diagnostic system 120 allows a root cause for a performance issue to be identified as well as a causality chain to the root cause to be identified. An issue detector 122 communicates a query that is analyzed by one or more analysis core modules 124. Various diagnostic modules within the analysis core modules 124 can perform various analysis and various determinations, and each can query one or more other analysis core modules 124 and/or diagnostic modules. In one or more embodiments, each query includes an indication of any previous information received by the analysis core module 124 and/or diagnostic module regarding the performance issue. This information is passed through to a scenario module 126, which can use the information to construct a causality chain from the performance issue to the root cause. Additionally or alternatively, in situations in which a central orchestrator invokes the appropriate analysis core modules and/or diagnostic modules, the central orchestrator can maintain the information associated with each query rather than passing the information through to each analysis core module and/or diagnostic module.

Figure 5:
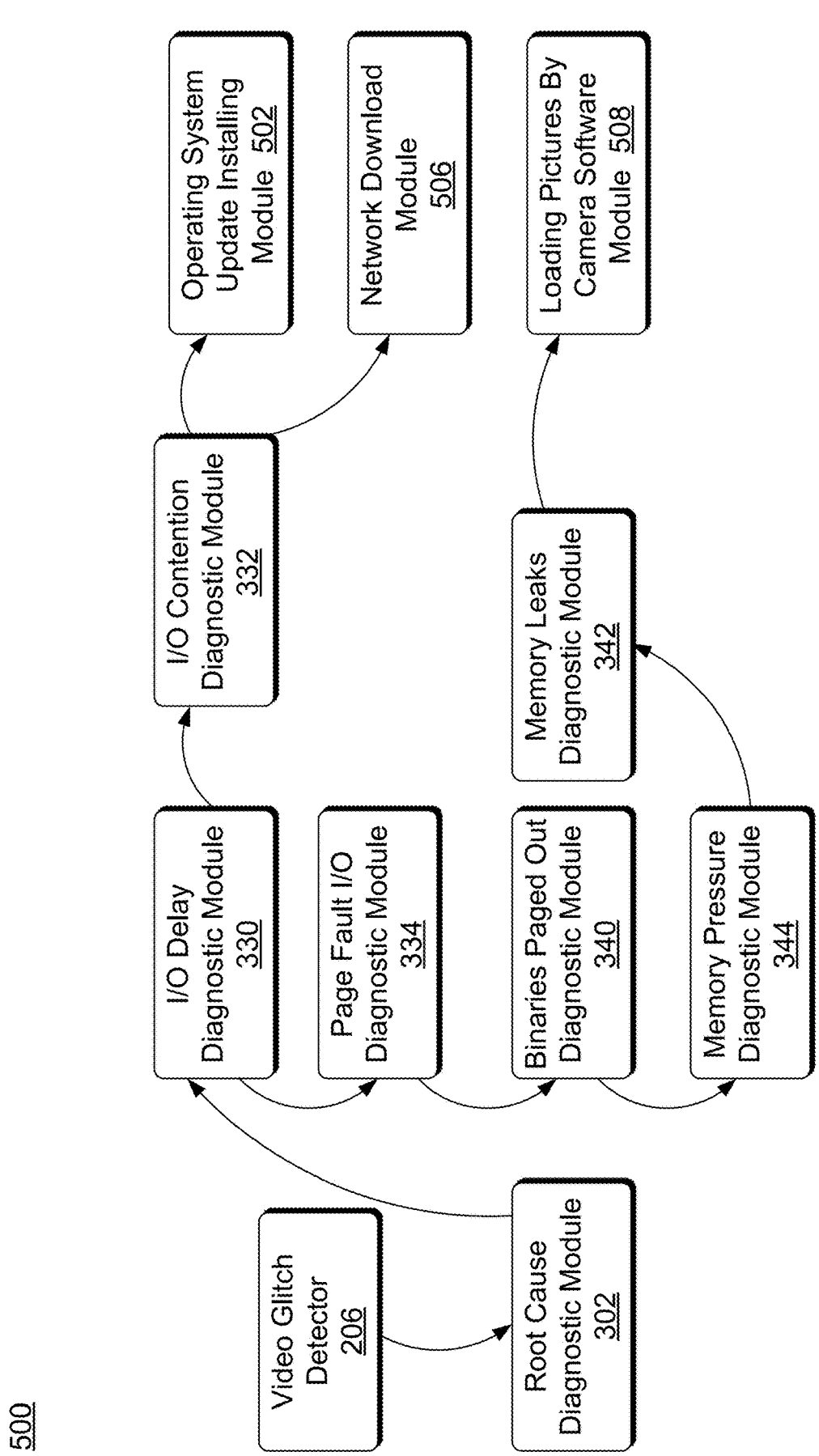
FIG. 5 illustrates an example of using the collaborative diagnostic system to identify the root cause for a performance issue as well as a causality chain to the root cause in accordance with one or more embodiments.

FIG. 5 illustrates an example 500 of using the collaborative diagnostic system to identify the root cause for a performance issue as well as a causality chain to the root cause in accordance with one or more embodiments. The example 500 is discussed with further reference to the issue detectors discussed in FIG. 2, the analysis core modules discussed in FIGS. 3A and 3B, and the scenario modules discussed in FIG. 4. The example 500 is discussed with reference to the issue detectors and diagnostic modules issuing queries to other diagnostic modules and the appropriate diagnostic modules responding to the queries. Alternatively, a central orchestrator could be used as discussed above.

In the example 500, a video glitch is observed by the video glitch detector 206. The video glitch detector analyzes a sequence of events from the event log 112 related to video glitches since it knows about the conditions which are to be met in order for a video glitch to occur. In this example, the desktop window manager couldn't push out a frame of video because of a long storage I/O it had to issue. Having that knowledge, the video glitch detector 206 passes the analysis on to the root cause diagnostic module 302 with a query of "desktop window manager couldn't meet the video synchronization (v-synch) deadline due to a long I/O—what happened?"

The root cause diagnostic module 302 determines that execution of the thread that implements the desktop window manager was late. The root cause diagnostic module 302 passes the analysis on to the I/O delay diagnostic module 330 with a query of "who owned the desktop window manager thread and why was the thread late?"

The I/O delay diagnostic module 330 (inside the I/O core module 124(5)) examines the long I/O for the thread. There are two fundamental queries that the I/O delay diagnostic module 330 makes—"why did the I/O happen in the first place?" and "why was that I/O slow?" The page fault I/O diagnostic module 334 receives the query and determines that the I/O is a page fault, and proceeds to determine why the page fault happened. The I/O contention diagnostic module 332 also receives the query and determines that the I/O was slow due to disk contention.

The I/O contention diagnostic module 332 analyzes I/O contention and discovers that that there are two other sources of the contending I/O activity: a stream of write requests by a thread of a trustedinstaller.exe process and another stream of write requests by a thread of a p2pclient.exe process. The I/O contention diagnostic module 332 then examines a list of known behaviors/scenarios for mention of I/O by these two processes and indeed finds two scenario modules, the operating system update installing module 502 and the network download module 506, which "own" (are associated with) both of these behaviors. The I/O contention diagnostic module 332 passes the contending I/O information to those two scenario modules, which each then create a final root-cause description for the issue.

The page fault I/O diagnostic module 334 passes the issue information to the binaries paged out diagnostic module 340, which recognizes that the I/O in question belongs to the dwm.exe process, was already read from disk not so long ago (e.g., less than a threshold amount of time ago, such as 2 minutes), and should be cached in memory unless it was evicted due to memory pressure. The page fault I/O diagnostic module 334 passes the issue information to the binaries paged out diagnostic module 340, which determines that the a memory page including binary of the dwm.exe process to be executed had been paged out and needed to be paged back in in order to be executed.

The binaries paged out diagnostic module 340 passes the issue information to the memory pressure diagnostic module 344, which determines why memory pressure existed on the system and caused the memory page to be paged out. The memory pressure diagnostic module 344 determines that the system has a 1 GB (gigabyte) outstanding memory allocation by a process camerasoftware.exe and inquires the memory leaks diagnostic module 342 whether these are memory leaks. The memory leaks diagnostic module 342 confirms that these allocations are several hours old (e.g., allocations made at least a threshold amount of time ago, such as 5 hours), and examines a list of known behaviors/scenarios for mention of large memory allocation activity by the camerasoftware.exe process and finds a scenario module (the loading pictures by camera software module 508) that describes building an image database scenario by the camerasoftware.exe process. The memory leaks diagnostic module 342 then passes the allocation information to the loading pictures by camera software module 508, which then creates the final root-cause descriptions for the issue.

As a result of this analysis, three scenario-tied root causes were found for the video glitch: a download by a p2p client, an operating system update service (trustedinstaller.exe) installing updates, and the memory pressure caused by a photography software suite. Each of the scenario modules (the operating system update installing module 502, the network download module 506, and the loading pictures by camera software module 508) can take a responsive action that incorporates the root cause and causality chain. For example, the operating system update installing module 502 can include an indication that the root cause of the video glitch is an operating system update service installing updates, and that the causality chain is: the I/O was slow, which was caused by two sources of contending I/O activity. By way of another example, the loading pictures by camera software module 508 can include an indication that the root cause of the video glitch is the memory pressure caused by a photography software suite, and that the causality chain is: the I/O was slow, which was caused by a page fault, which was for a multiple that was already read not long ago and should be in cached memory but was paged out and needed to be paged back in due to memory pressure, and that the memory pressure was caused by memory leaks due to memory allocations made to the photography software suite.

The scenario modules (the operating system update installing module 502, the network download module 506, and the loading pictures by camera software module 508) can optionally communicate with one another to determine an appropriate fix or responsive action to take, which would be a fix to the photography software suite to reduce or eliminate the memory leaks. Various different rules or criteria can be used to determine which scenario module includes the appropriate responsive action. For example, the scenario modules may be ranked with the responsive action for the highest ranking scenario module being used (e.g., windows update installing is something that is appropriate for the system and wouldn't typically need a fix, and thus the fix would be for the photography software suite).

Returning to FIG. 1, it should be noted that situations can arise in which no root cause is identified for a particular performance issue. In one or more embodiments, such situations can be resolved by having additional cycles or iterations through the collaborative diagnostic system 120. These additional cycles or iterations can return back to the same issue detector 122 as detected the performance issue. The issue detector 122 can go back to a previous time (e.g., 20 milliseconds before the last performance issue was detected), to a previous event (e.g., the last time, prior to the performance issue being detected, that the v-synch deadline), and so forth. For example, assume that the issue detector 122 is a video glitch detector and that the issue detector detects a video glitch that because the v-synch deadline was missed due to a performance problem 10 display frames (10 v-synch deadlines) ago, but the performance problem has since been resolved and thus no root cause for the video glitch is identified. The issue detector 122 is notified (e.g., by a scenario module 126) of this inability to identify a root cause, and in response can identify the previous v-synch deadline and submit a query to the analysis core modules 124 regarding why the previous v-synch deadline was missed, which may or may not identify a root cause. This process can be repeated until a query is submitted to the analysis core module 124 regarding why the v-synch deadline 10 display frames ago was missed, which will identify a root cause for the v-synch deadline being missed.

It should also be noted that, as discussed above, the event tracing module 110 logs various different data regarding events that occur in the system 100 in the event log 112. In one or more embodiments, the logging of data regarding events can be turned on and off at different times for different applications or programs in order to reduce the amount of time and storage space expended to record the data. For example, event tracing module 110 may be able to log data regarding different events for a particular application 108, although by default turns off logging of data for events regarding that particular application 108. If a situation arises later indicating that logging of data for events regarding that particular application 108 should be turned on, then the event tracing module 110 begins logging data for events regarding that particular application.

By way of example, assume that a video glitch performance issue was detected, and the root cause ended up being an issue with a thread running as part of a Web browser application 108. However, logging of data for events regarding the Web browser application 108 was not previously being performed by the event tracing module 110. A scenario module 126 can take the responsive action of having the event tracing module 110 begin logging data for events regarding the Web browser application 108. Accordingly, if a video glitch performance issue is again detected and is due to an issue with a thread running as part of the Web browser application 108, one or more analysis core modules 124 can further analyze the performance issue and determine the root cause of the performance issue in the thread of the Web browser application 108. Thus, the collaborative diagnostic system 120 can self-identify additional diagnostics that are needed, and turn on event logging to obtain data for those additional diagnostics in the future.

Figure 6:
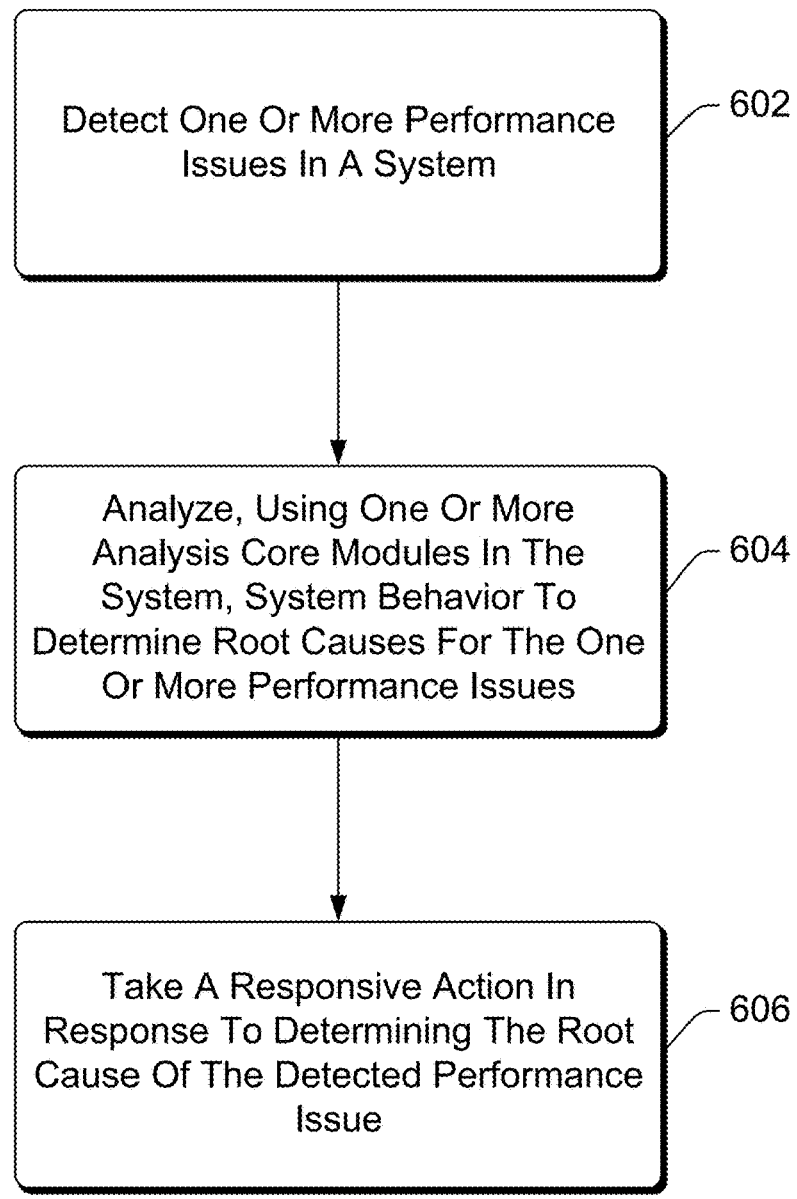
FIG. 6 is a flowchart illustrating an example process for implementing the modularized performance issue diagnostic system in accordance with one or more embodiments.

FIG. 6 is a flowchart illustrating an example process 600 for implementing the modularized performance issue diagnostic system in accordance with one or more embodiments. Process 600 is carried out by a system, such as collaborative diagnostic system 120 of FIG. 1, and can be implemented in software, firmware, hardware, or combinations thereof. Process 600 is shown as a set of acts and is not limited to the order shown for performing the operations of the various acts. Process 600 is an example process for implementing the modularized performance issue diagnostic system; additional discussions of implementing the modularized performance issue diagnostic system are included herein with reference to different figures.

In process 600, one or more performance issues in a system are detected (act 602). This system refers to a system (e.g., a service hosted in the cloud, a computing device, etc.) that includes the system implementing process 600 (e.g., that includes the collaborative diagnostic system 120 of FIG. 1). The one or more performance issues are detected by one or more issue detectors as discussed above.

One or more analysis core modules are used to analyze system behavior to determine root causes for the detected one or more performance issues (act 604). Each of the analysis core modules includes diagnostic modules that are specific to that analysis core module to help determine what is happening in the system. The diagnostic modules collaborate with one another, submitting queries that are responded to by the appropriate diagnostic module as discussed above.

A responsive action is taken in response to determining the root cause of the detected performance issue (act 606). The responsive action is taken by one or more scenario modules that are associated with the root cause, as discussed above.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
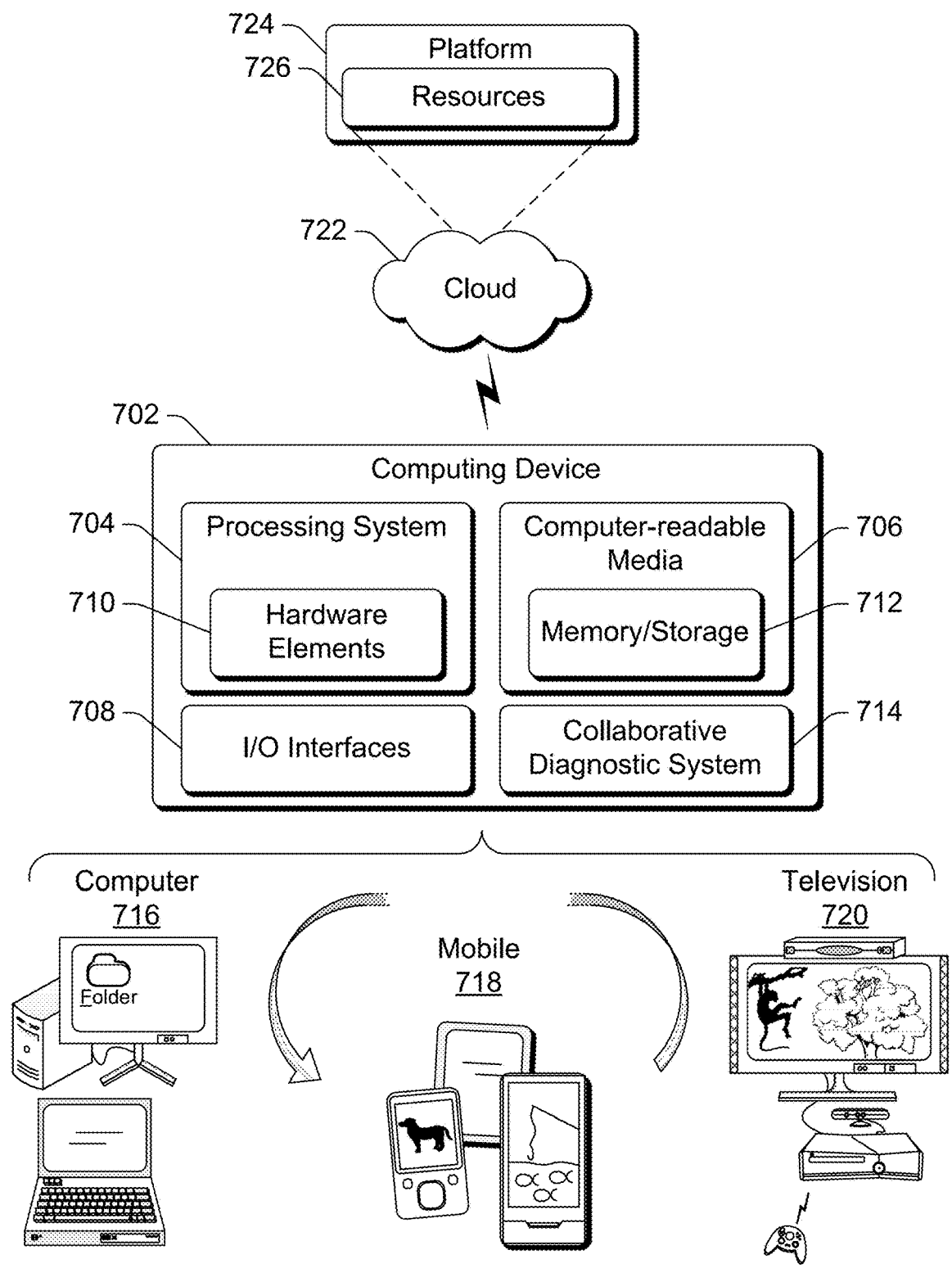
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Resistive RAM (ReRAM), Flash memory, optical disks, magnetic disks, and so forth). The memory/ storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes a collaborative diagnostic system 714. The collaborative diagnostic system 714 provides various functionality to identify performance issues within the system and a causality chain from an identified performance issue to the root cause of that performance issue, as discussed above. The collaborative diagnostic system 714 can implement, for example, the collaborative diagnostic system 120 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also optionally be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: detecting, by each of multiple issue detectors in a system, one or more performance issues in the system; analyzing, by one or more analysis core modules in the system, system behavior to determine root causes for the one or more performance issues, each of the one or more analysis core modules receiving, in response to one of the multiple issue detectors detecting a performance issue in the system, a query regarding the detected performance issue; and taking, by a first scenario module of multiple scenario modules in the system, the first scenario module being associated with a root cause for the detected performance issue, a responsive action in response to the root cause for the detected performance issue being determined by the multiple analysis modules.

Alternatively or in addition to any of the methods, devices, or systems described herein, any one or combination of: the taking the responsive action comprising presenting an indication of the root cause of the detected performance issue; the taking the responsive action further comprising presenting a causality chain for the detected performance issue; the taking the responsive action comprising turning on logging of event data for an application running in the system; each of the multiple analysis core modules including multiple diagnostic modules, and the analyzing comprising performing, by the diagnostic modules of one of the multiple analysis core modules, behavior-specific analysis for a conceptual area of the one analysis core module; one of the multiple analysis core modules operating as a central orchestrator, and the analyzing comprising invoking, by the central orchestrator, appropriate ones of the analysis core modules and/or issue detectors to identify the root cause for the detected performance issue; the analyzing comprising analyzing the system behavior in response to a query broadcast from one of the multiple issue detectors and/or analysis core modules in the system; the method further comprising repeating the detecting and the analyzing until a root cause for the detected performance issue is identified; the multiple issue detectors, multiple analysis core modules, and multiple scenario modules being part of a collaborative diagnostic system that is expandable to include additional issue detectors, analysis core modules, and scenario modules in response to newly discovered information regarding the system.

A system comprising: multiple issue detectors each configured to detect one or more performance issues in the system; multiple analysis core modules each configured to analyze and correlate system behavior to determine root causes for the one or more performance issues, each of the multiple issue detectors being further configured to communicate, in response to a detected performance issue in the system, a query regarding the detected performance issue to one or more of the multiple analysis core modules; multiple scenario modules, each configured to take one or more responsive actions; and a first scenario module of the multiple scenario modules being associated with a root cause for the detected performance issue and taking a responsive action in response to the root cause for the detected performance issue being determined by the multiple analysis modules.

Alternatively or in addition to any of the methods, devices, or systems described herein, any one or combination of: the responsive action comprising presenting an indication of the root cause of the detected performance issue; the responsive action further comprising presenting a causality chain for the detected performance issue; the responsive action comprising turning on logging of event data for an application running in the system; each of the multiple analysis core modules being configured to analyze and correlate low level system behavior within a different conceptual area, and each of the multiple analysis core modules including multiple diagnostic modules configured to perform behavior-specific analysis for the conceptual area of the analysis core module; one of the multiple analysis core modules operating as a central orchestrator invoking appropriate ones of the analysis core modules and/or issue detectors to identify the root cause for the detected performance issue; each of the multiple issue detectors including a query interface allowing each issue detector to broadcast queries to other ones of the multiple issue detectors and to respond to queries broadcast from other ones of the multiple issue detectors; a second scenario module of the multiple scenario modules being unable to identify the root cause for the detected performance issue, but indicating to the one of the multiple issue detectors to communicate an additional query to the multiple analysis core modules to determine the root cause for the detected performance issue; the multiple issue detectors, multiple analysis core modules, and multiple scenario modules being part of a collaborative diagnostic system that is expandable to include additional issue detectors, analysis core modules, and scenario modules in response to newly discovered information regarding the system.

A system comprising: one or more processors; and a computer-readable storage medium having stored thereon multiple instructions that, responsive to execution by the one or more processors, cause the one or more processors to: detect, by each of multiple issue detectors in the system, one or more bad behaviors in the system; analyze, by one or more analysis core modules in the system, system behavior to determine root causes for the one or more bad behaviors, each of the one or more analysis core modules receiving, in response to one of the multiple issue detectors detecting a bad behavior in the system, a query regarding the detected bad behavior; and take, by a first scenario module of multiple scenario modules in the system, the first scenario module being associated with a root cause for the detected bad behavior, a responsive action in response to the root cause for the detected bad behavior being determined by the multiple analysis modules.

Alternatively or in addition to any of the methods, devices, or systems described herein, any one or combination of: the taking the responsive action comprising presenting an indication of the root cause of the detected bad behavior as well as a causality chain for the detected bad behavior.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    detecting, in a computing system, a performance issue in the computing system based on a set of rules or criteria;
    in response to detecting the performance issue,
        analyzing, in the computing system, one or more corresponding system behaviors to identify a root cause for the detected performance issue in the computing system, wherein the analyzing one or more corresponding system behaviors includes:
            receiving a query identifying the detected performance issue;
            in response to receiving the query identifying the detected performance issue, determining a corresponding system behavior at a time of the detected performance issue based on an event log containing records of tasks performed in the computing system at various times;
            based on the determined corresponding system behavior, issuing another query to determine another corresponding system behavior that causes the determined system behavior based on the event log; and
            repeating the determining and issuing operations using the another corresponding system behavior until the root cause for the detected performance issue is identified; and
    performing, in the computing system, a responsive action in response to the identified root cause for the detected performance issue.

2. The method of claim 1, wherein performing the responsive action comprising presenting an indication of the root cause of the detected performance issue.

3. The method of claim, 2, wherein performing the responsive action further comprising presenting a causality chain for the detected performance issue.

4. The method of claim 1, wherein the responsive action comprises turning on logging of event data for an application running in the computing system.

5. The method of claim 1, wherein analyzing the one or more corresponding system behavior includes performing behavior-specific analysis for a conceptual area of the computing system.

6. A method performed in a computing system having a processor executing multiple processes and providing multiple analysis modules individually configured to analyze and correlate system behaviors in the computing system, the method comprising:
    detecting, in a computing system, a performance issue of executing the one or more processes in the computing system based on a set of rules or criteria;
    in response to detecting the performance issue in the computing system,
        issuing a query to an analysis module for identifying a system behavior related to an operation performed by one of the processes at a time of the detected performance issue in the computing system based on an event log having records individually containing metadata describing system events occurred in the computing system at various times;
        receiving, from the analysis module, the identified system behavior of the operation performed by one of the processes at the time of the detected performance issue in the computing system;
        based on the identified system behavior of the operation performed by the one of the processes, issuing another query to the analysis module or another analysis module for determining another system behavior of another operation that causes the identified system behavior; and
        repeating the issuing and receiving operations using the determined another system behavior to determine one or more additional system behaviors until a root cause for the detected performance issue is identified; and
    performing, in the computing system, a responsive action in response to the identified root cause for the detected performance issue.

7. The method of claim 6, wherein:

the system behavior is a first system behavior; and
the method further includes:
    identifying another operation performed by another one of the processes at the time of the detected performance issue in the computing system based on the event log; and
    based on the identified another operation, determining a second system behavior that caused the first system behavior.

8. The method of claim 6, wherein the individual system events include an inter-process call, a file I/O access by a process, a call by a process to an operating system in the computing system, or a network access by a process in the computing system.

9. The method of claim 6, further comprising:
    forming a causality chain having one end representing the detected performance issue, another end representing the root cause, and one or more intermediate nodes individually representing one of the determined system behaviors.

10. The method of claim 6, further comprising:
    forming a causality chain having one end representing the detected performance issue, another end representing the root cause, and one or more intermediate nodes individually representing one of the determined system behaviors, at least one of the nodes being connected to multiple branches of the causality chain.

11. The method of claim 6, wherein detecting the performance issue includes analyzing metadata of a sequence of system events in the event log based on one or more conditions.

12. The method of claim 6, wherein determining the system behavior includes determining the system behavior that causes the operation performed by the process in the computing system to be late.

13. The method of claim 6, wherein determining the system behavior includes determining the system behavior that causes the operation performed by the process in the computing system to be late, and wherein the method further includes identifying another one of the processes that owned the identified operation and determining another system behavior that causes execution of the another one of the processes to be late.

14. A computing system, comprising:
    a processor; and
    a memory having instructions executable by the processor to provide multiple processes and analysis modules individually configured to analyze and correlate system behaviors in the computing system and to cause the computing system to:
        upon detecting, in the computing system, a performance issue of executing the one or more processes in the computing system based on a set of rules or criteria;
            issue a query to an analysis module for determining a corresponding system behavior at a time of the detected performance issue in the computing system based on an event log having records individually containing metadata regarding system events occurred in the computing system at various times;
            receive, from the analysis module, the determined corresponding system behavior;
            based on the received corresponding system behavior, issue another query to another analysis module to determine another corresponding system behavior that causes the determined system behavior;
        repeat the determining and issuing operations using the determined another corresponding system behavior until a root cause for the detected performance issue is identified; and
        perform, in the computing system, a responsive action in response to the identified root cause for the detected performance issue.

15. The computing system of claim 14, wherein:
the system behavior is a first system behavior; and
the memory includes additional instructions executable by the processor to cause the computing system to:
    identify another operation performed by another one of the processes at the time of the detected performance issue in the computing system based on the event log; and
    based on the identified another operation, determine a second system behavior that caused the first system behavior.

16. The computing system of claim 14, wherein the individual system events include an inter-process call, a file I/O access by a process, a call by a process to an operating system in the computing system, or a network access by a process in the computing system.

17. The computing system of claim 14, the memory includes additional instructions executable by the processor to cause the computing system to:
    form a causality chain having one end representing the detected performance issue, another end representing the root cause, and one or more intermediate nodes individually representing one of the determined system behaviors.

18. The computing system of claim 14, the memory includes additional instructions executable by the processor to cause the computing system to:
    form a causality chain having one end representing the detected performance issue, another end representing the root cause, and one or more intermediate nodes individually representing one of the determined system behaviors, at least one of the nodes being connected to multiple branches of the causality chain.

19. The computing system of claim 14, wherein to detect the performance issue includes to analyze metadata of a sequence of system events in the event log based on one or more conditions.

20. The computing system of claim 14, wherein to determine the system behavior includes to determine the system behavior that causes the operation performed by the process in the computing system to be late, and wherein the memory includes additional instructions executable by the processor to cause the computing system to identify another one of the processes that owned the identified operation and determining another system behavior that causes execution of the another one of the processes to be late.

* * * * *